United States Patent [19]
Kobayashi et al.

[11] Patent Number: 5,488,591
[45] Date of Patent: Jan. 30, 1996

[54] IMPROVED MAGNETO-OPTICAL RECORDING APPARATUS FOR DIGITAL SIGNAL INFORMATION

[75] Inventors: Michio Kobayashi; Hiroshi Hirayama; Satoshi Nebashi, all of Suwa, Japan

[73] Assignee: Seiko Epson Corporation, Tokyo, Japan

[21] Appl. No.: 309,286

[22] Filed: Sep. 20, 1994

[30] Foreign Application Priority Data

Dec. 24, 1993 [JP] Japan .................... 5-328592

[51] Int. Cl.$^6$ .................... G11B 11/00
[52] U.S. Cl. .................... 369/13; 369/47
[58] Field of Search .................... 369/13, 59, 48, 369/124, 50, 54, 58, 47, 44.25, 124, 14; 360/41, 59, 114

[56] References Cited

U.S. PATENT DOCUMENTS

| | | | |
|---|---|---|---|
| 5,070,492 | 12/1991 | Ogawa et al. | 369/47 |
| 5,189,650 | 2/1993 | Watanabe et al. | 369/13 |
| 5,311,493 | 5/1994 | Fuji | 369/59 |
| 5,363,352 | 11/1994 | Tobita et al. | 369/13 |

FOREIGN PATENT DOCUMENTS 4-221464  8/1992  Japan .
5-2842    1/1993  Japan .

OTHER PUBLICATIONS

Faculty of Engineering, Ehime University, Japan, vol. 44, No. 10, pp. 1369–1375 (1990) "Applications of New Variable–Length Block Code and Viterbi Decoding Using d–constraint to Magneto–Optical Recording"; Hisashi Osawa, Kenji Yamauchi, and Saburo Tazaki.

Primary Examiner—Ali Neyzari
Attorney, Agent, or Firm—Harold T. Tsiang

[57] ABSTRACT

A magneto-optical recording apparatus capable of maintaining decoding performance even if the recording density at the magneto-optical recording is high. The magneto-optical recording apparatus comprises a modulator for RLL (Run-Length Limited) encoding recording data, an NRZI encoder for NRZI-encoding a RLL code from the modulator, an equalizer for equalizing a read-out analog signal obtained from a magneto-optical recording medium into a waveform $(1+D)^n$ (n is a positive integer) assuming that the delay time for one bit period of the read-out signal is D, a low pass filter, and a Viterbi decoder that uses the difference between a sample value obtained by quantizing an output from the low pass filter and an expected value obtained from a theoretical value of a data column to make the most probable path to be decoding data.

24 Claims, 12 Drawing Sheets

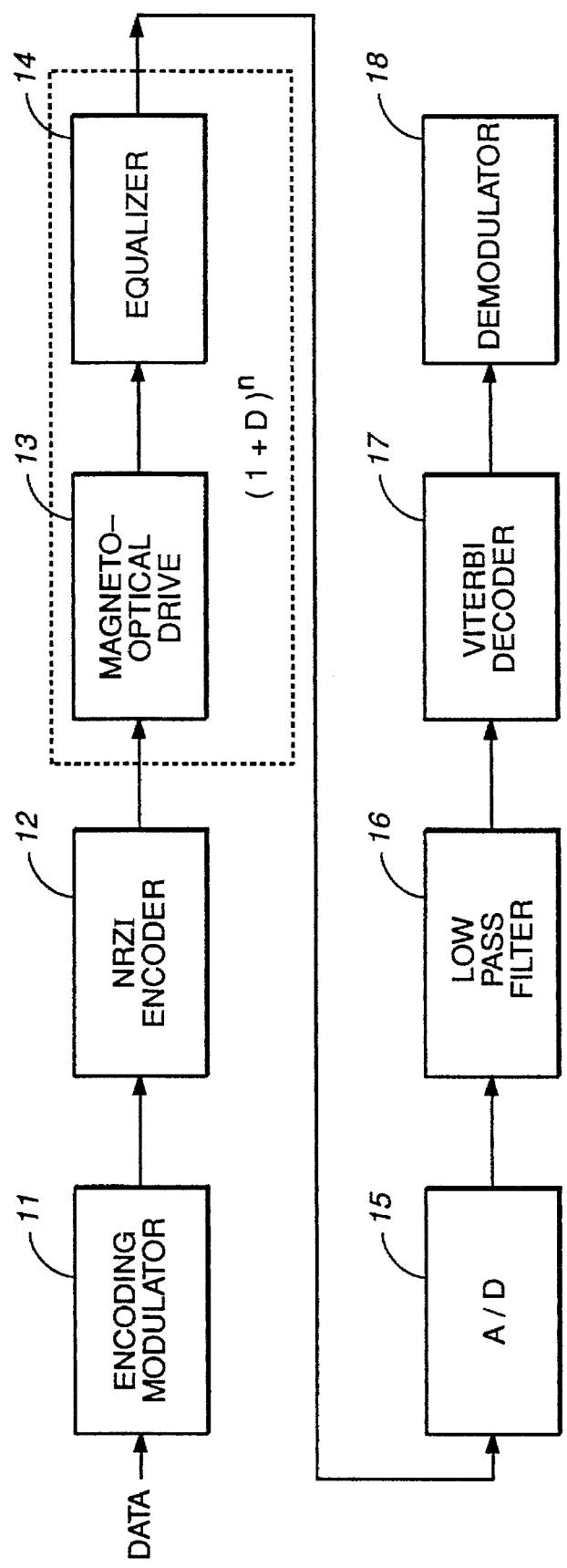
FIG._1

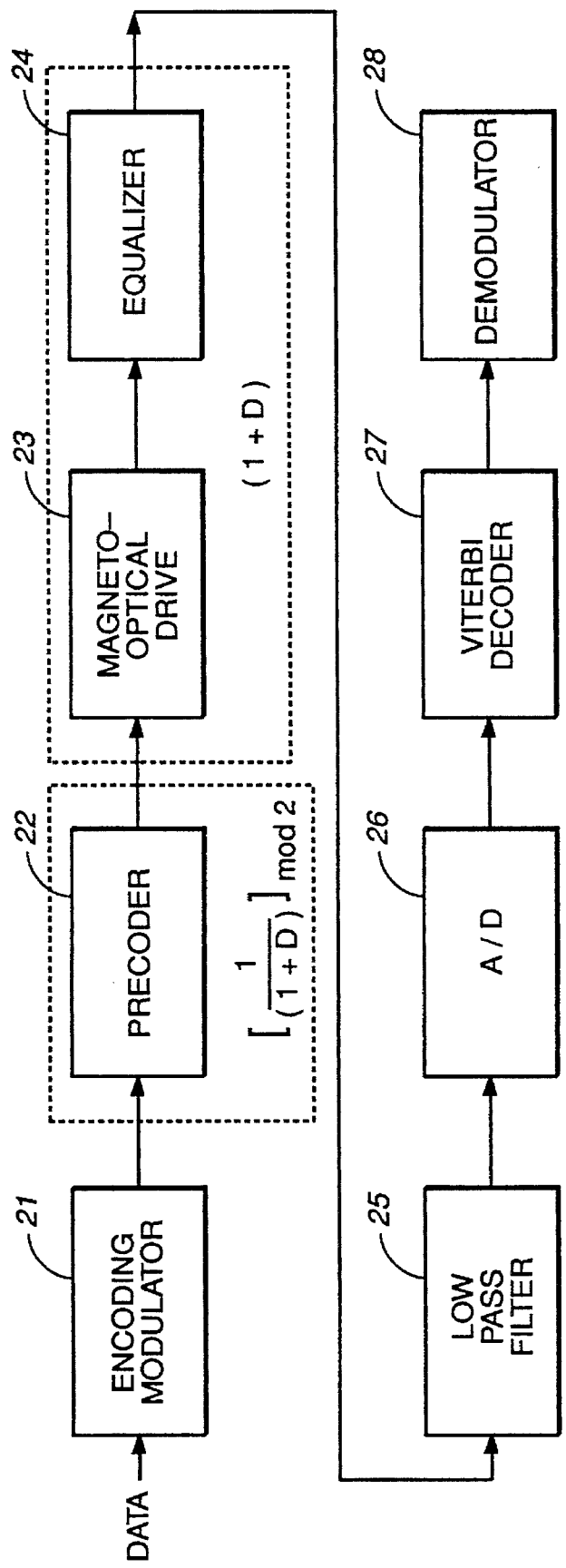
FIG._2
*(PRIOR ART)*

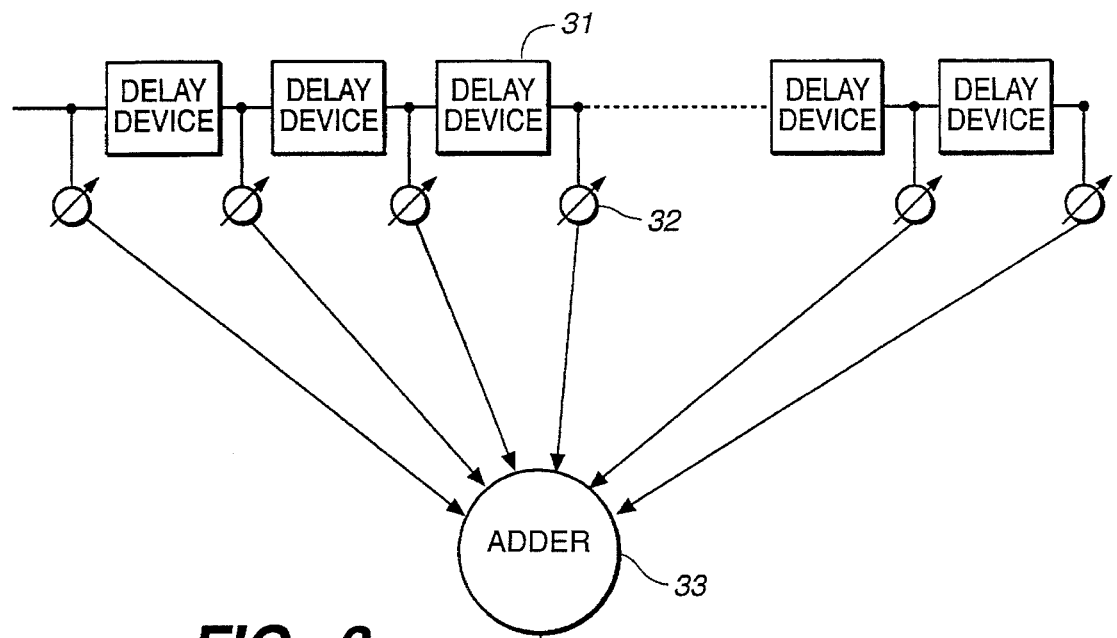
FIG._3
*(Prior Art)*
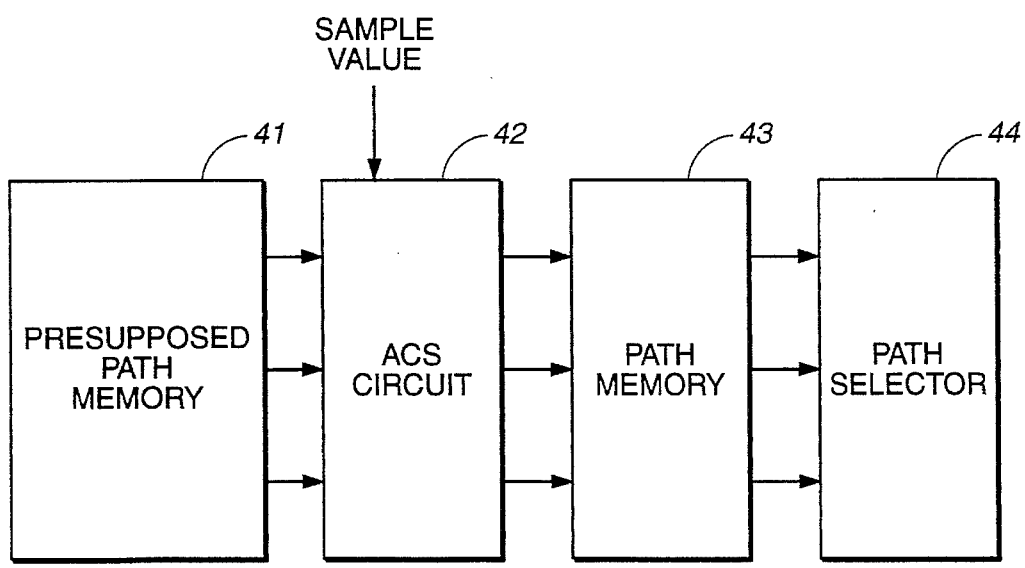
FIG._4
*(Prior Art)*

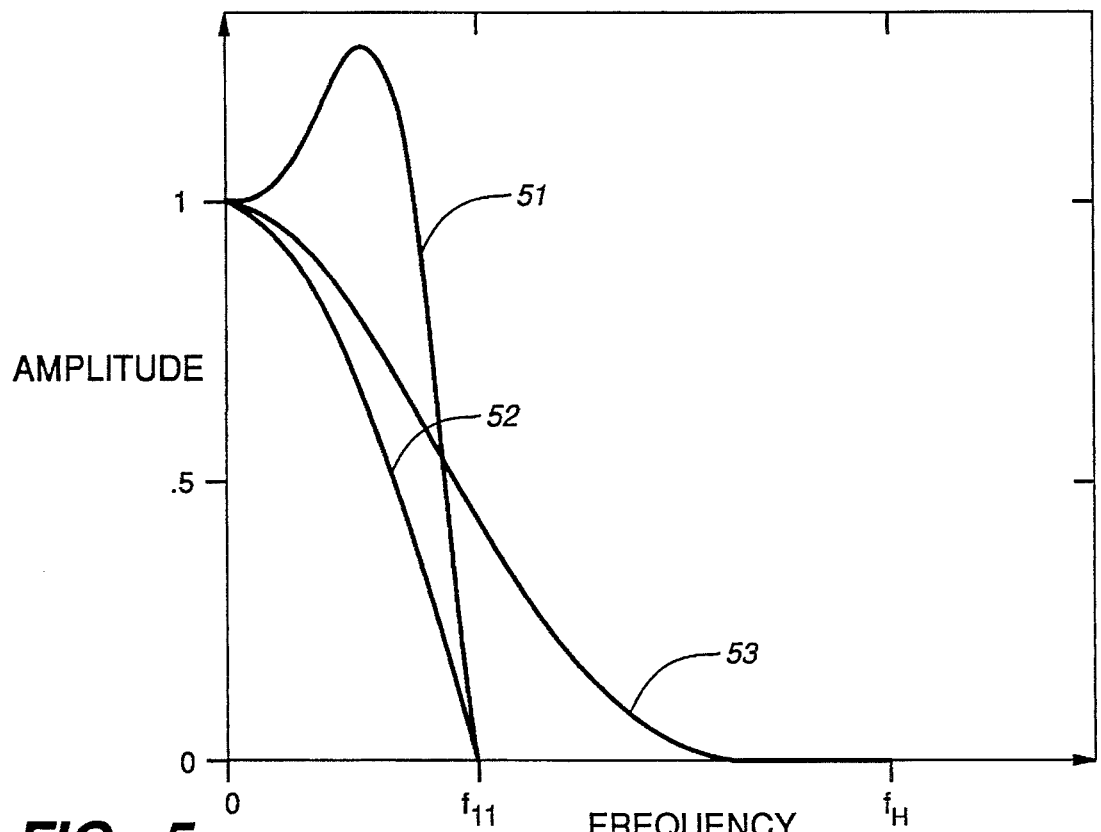
FIG._5
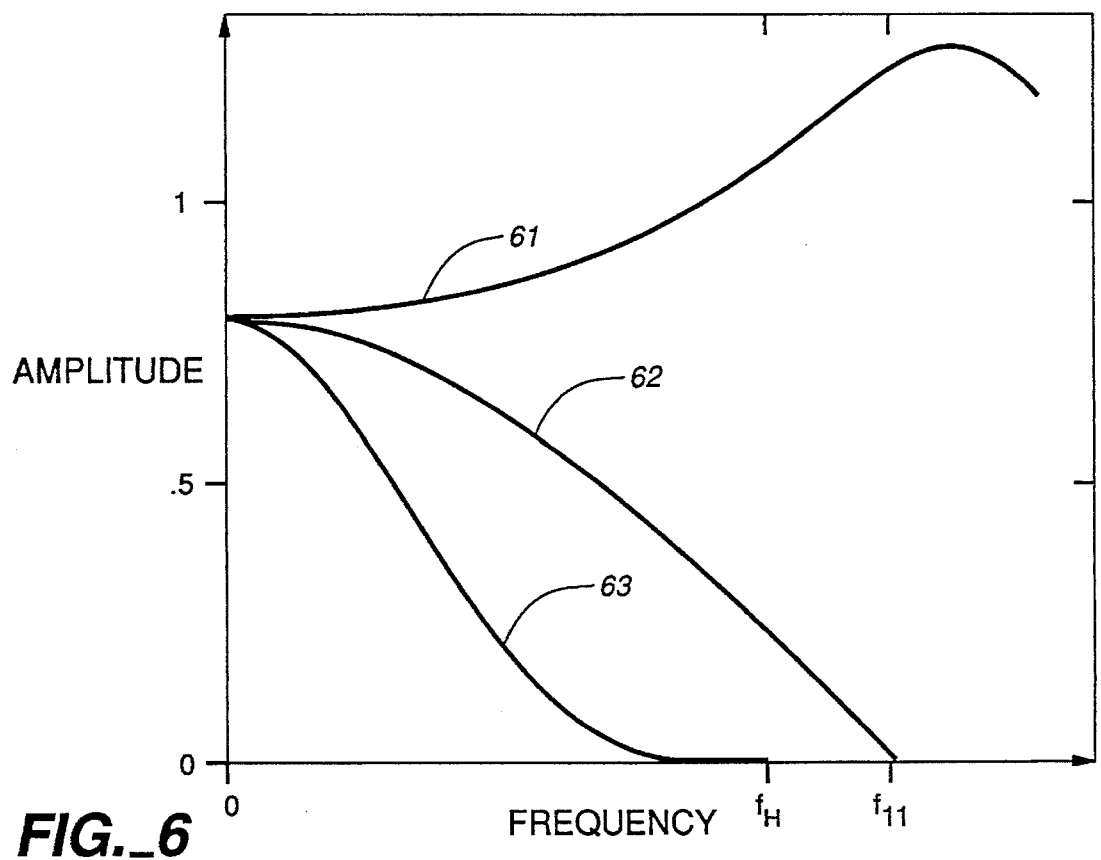
FIG._6

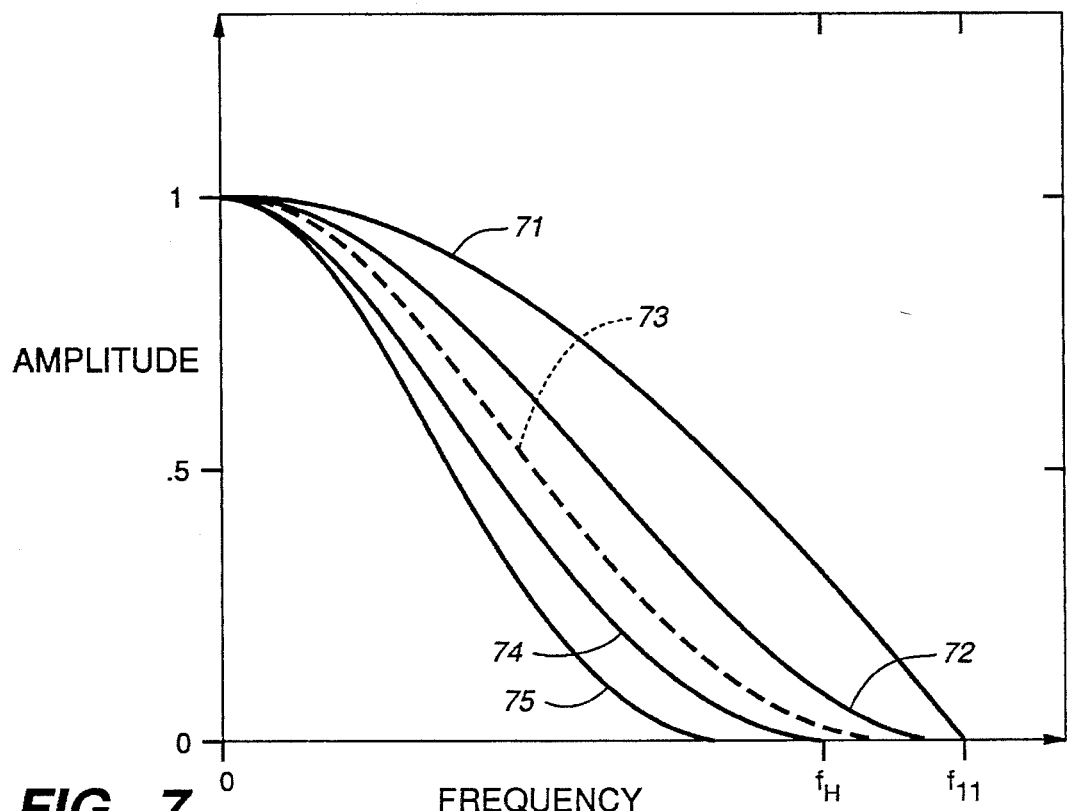
FIG._7
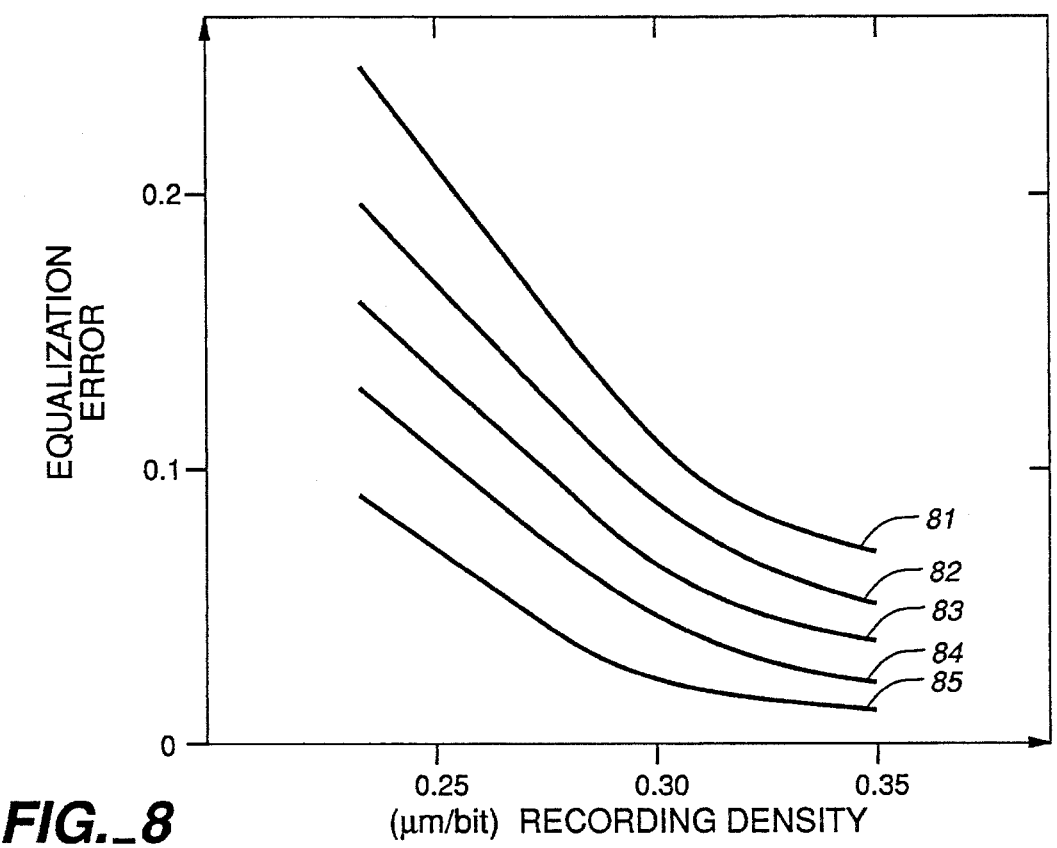
FIG._8

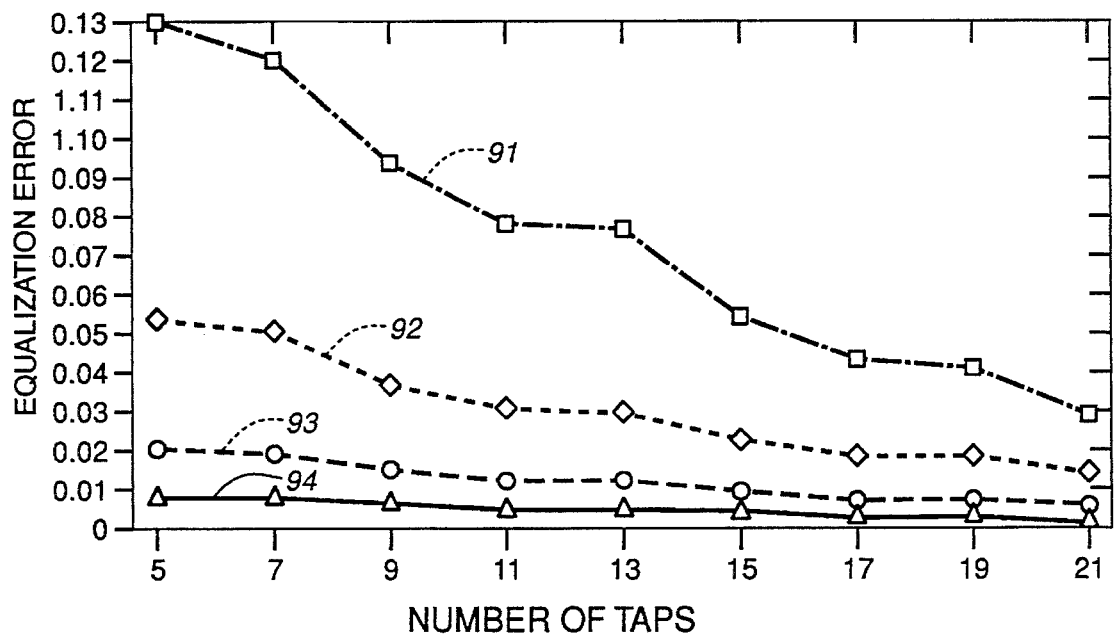
FIG._9
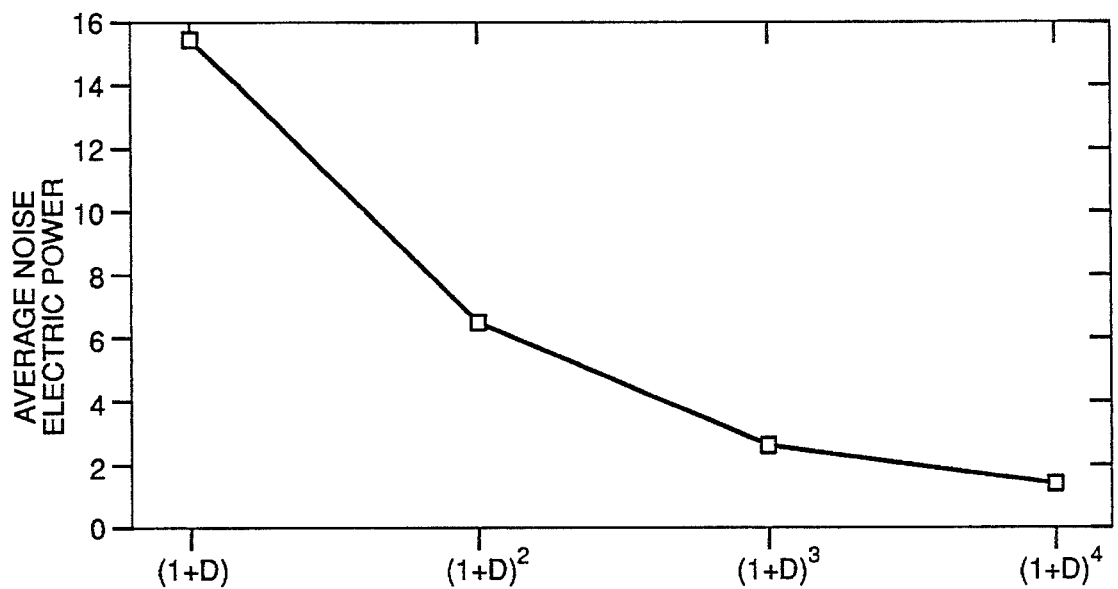
FIG._10

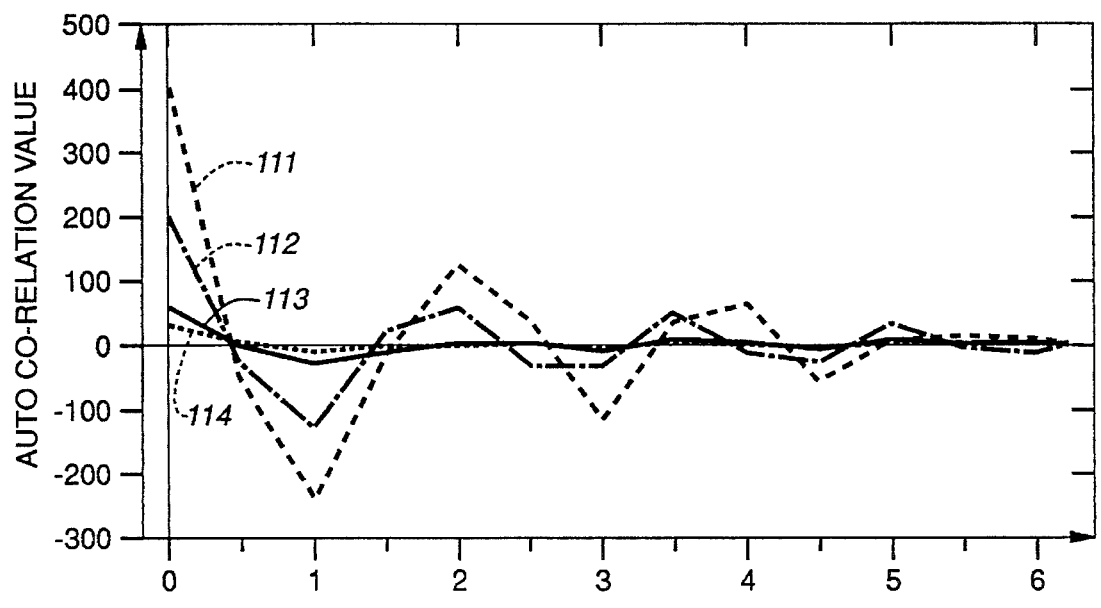
FIG._11
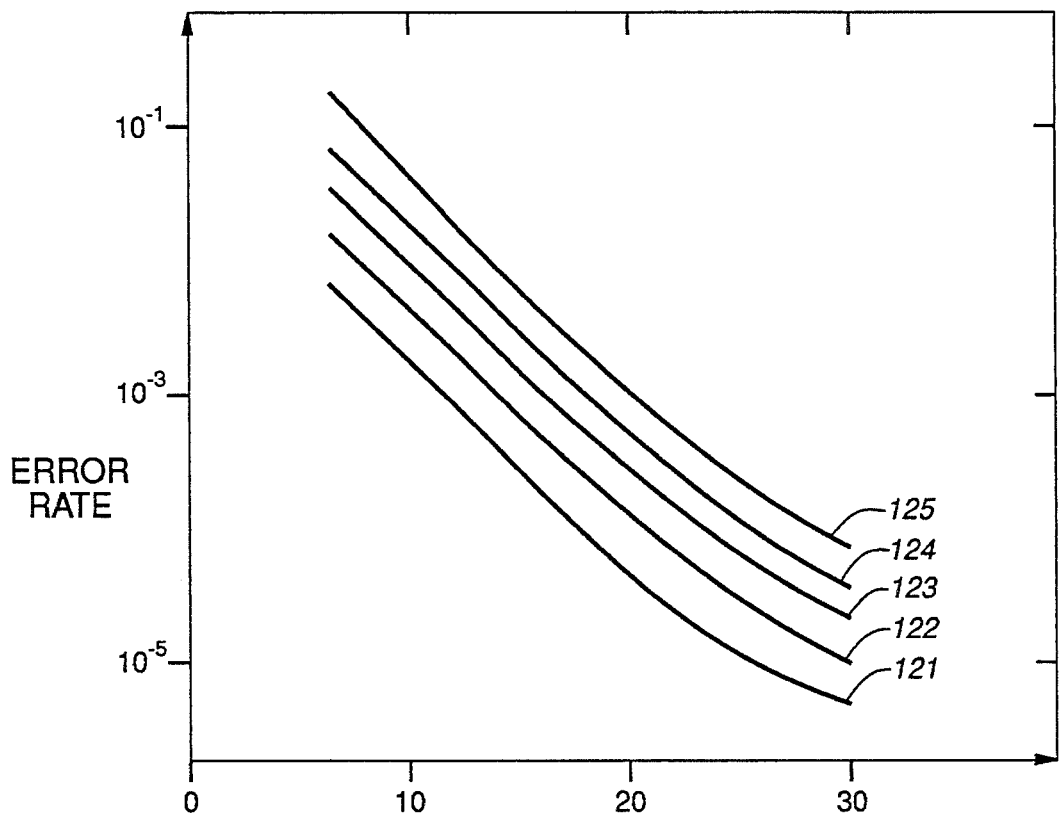
FIG._12

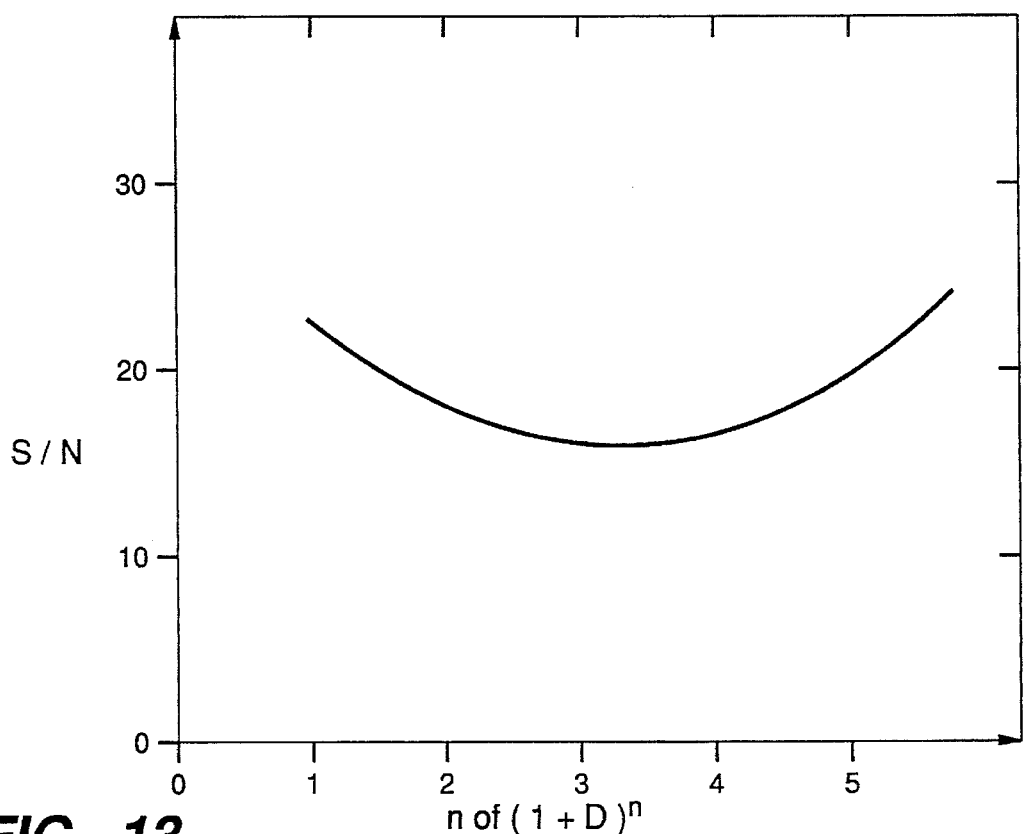
FIG._13
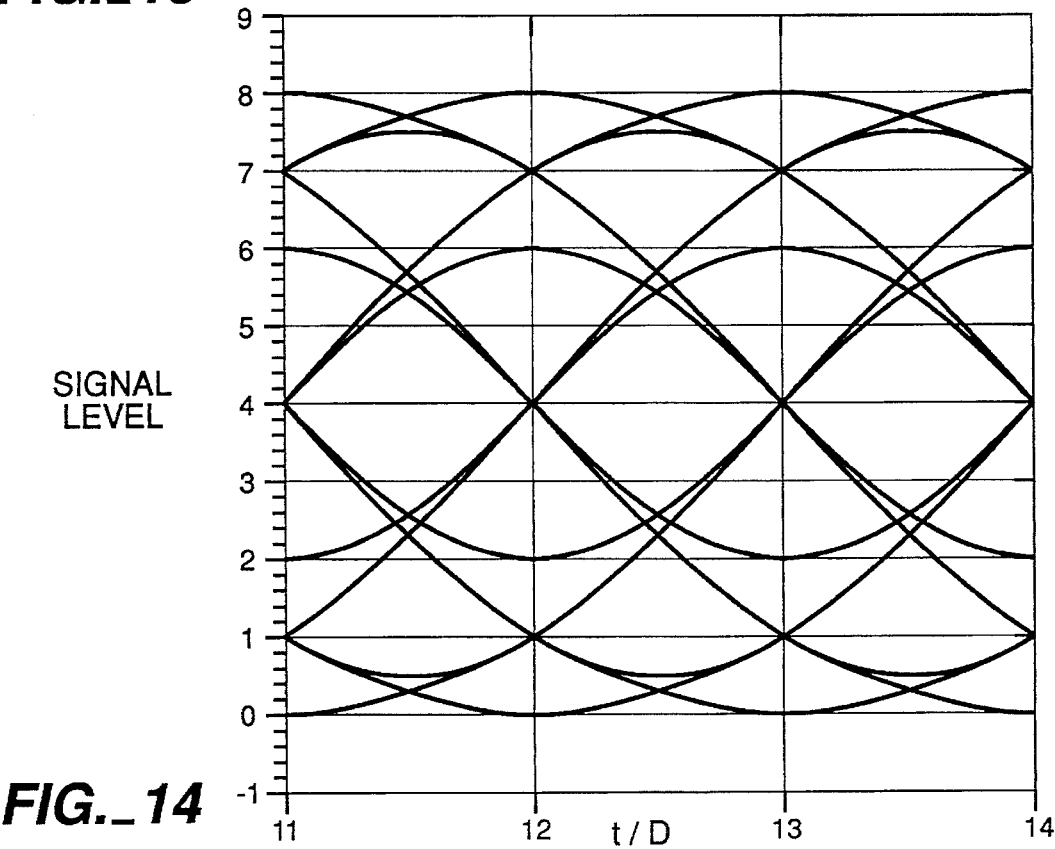
FIG._14

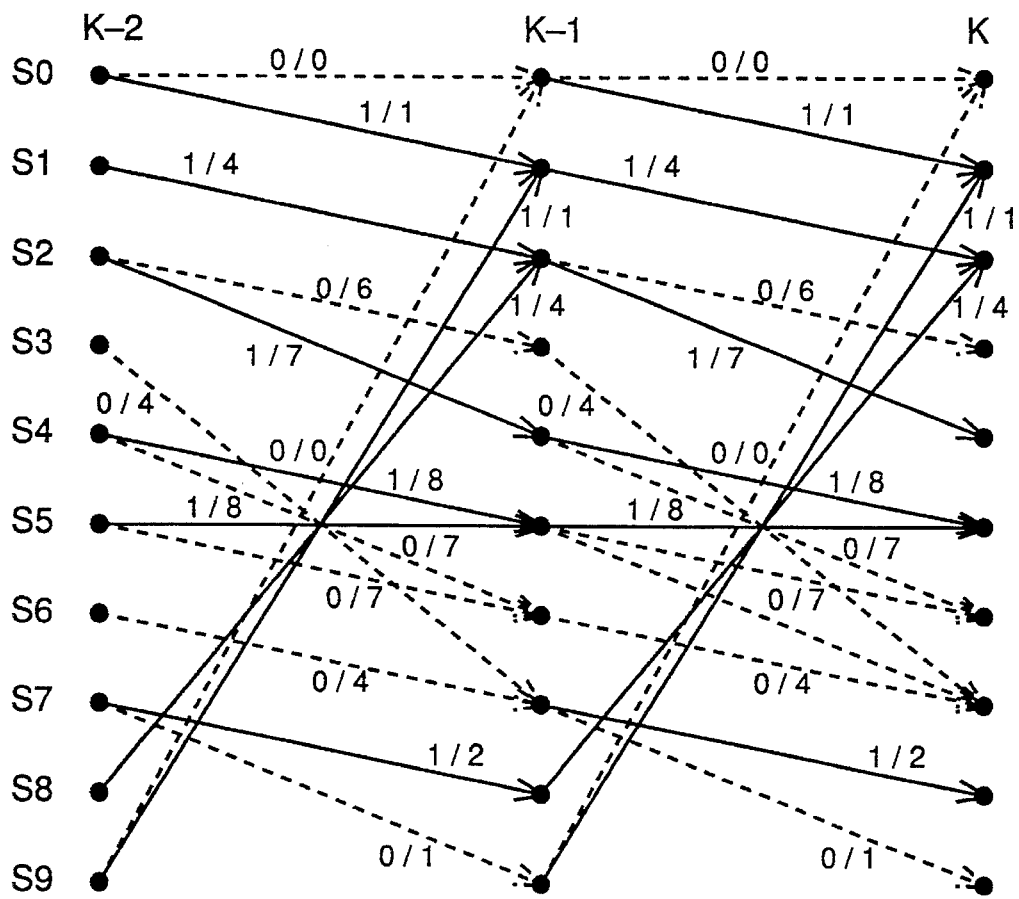
FIG._15
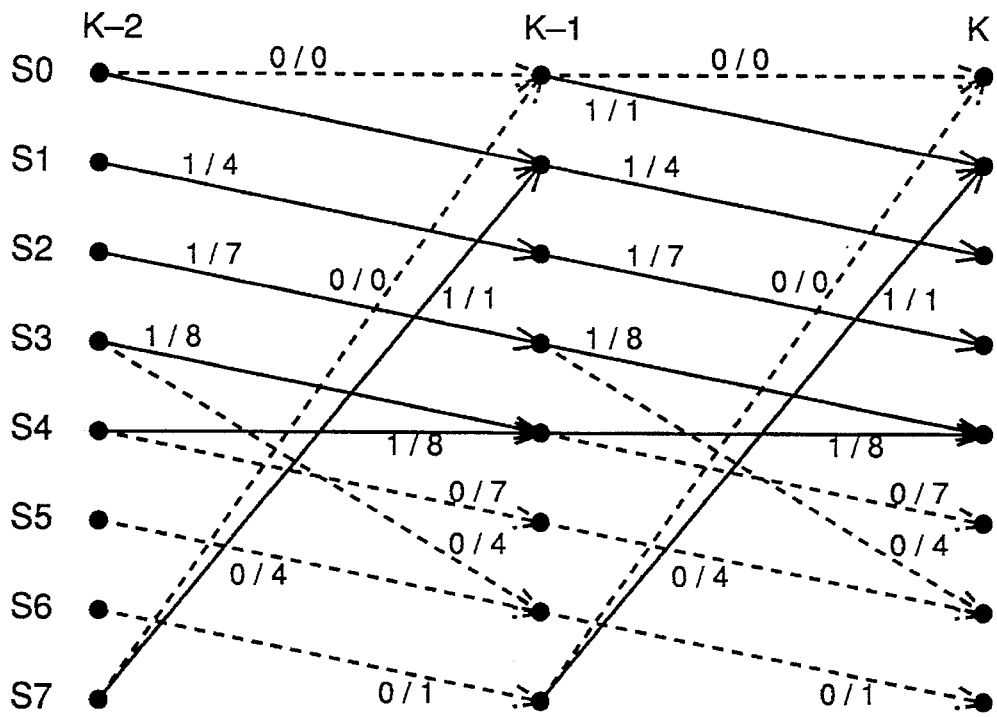
FIG. 19

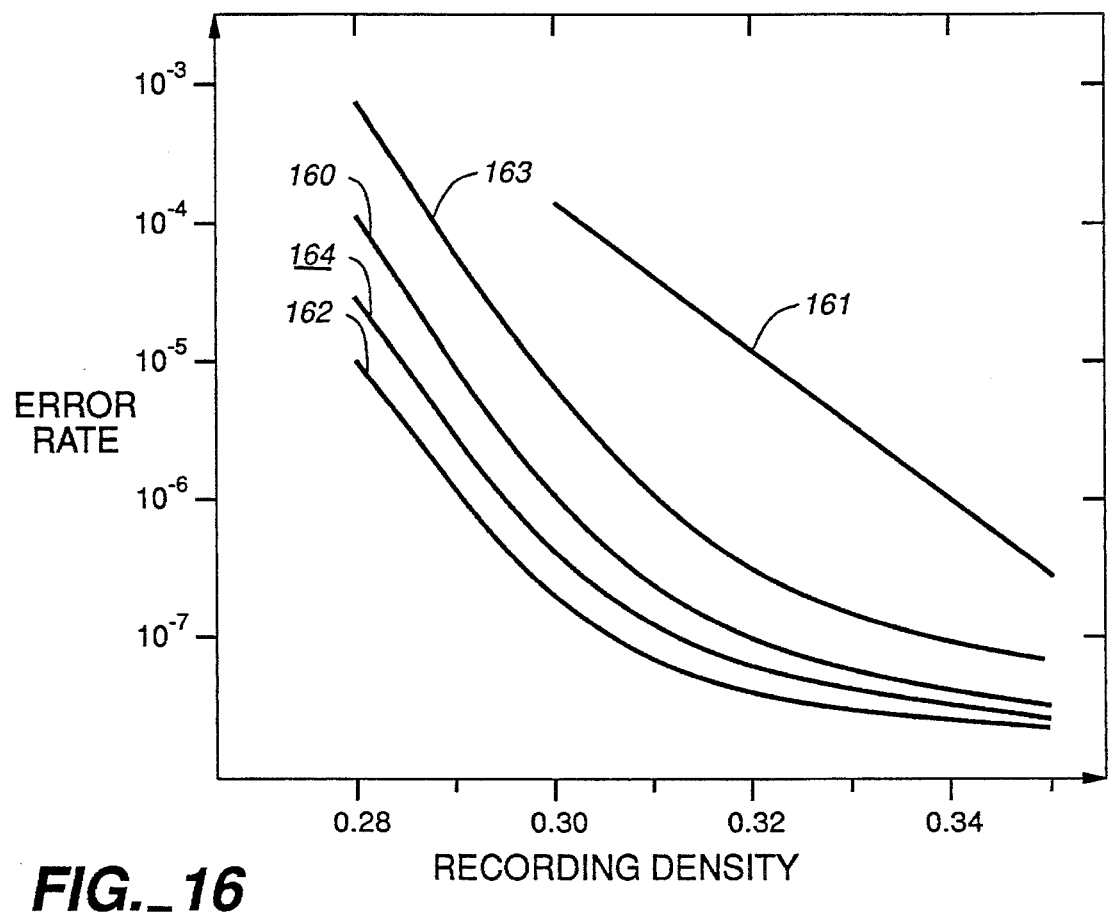
FIG._16
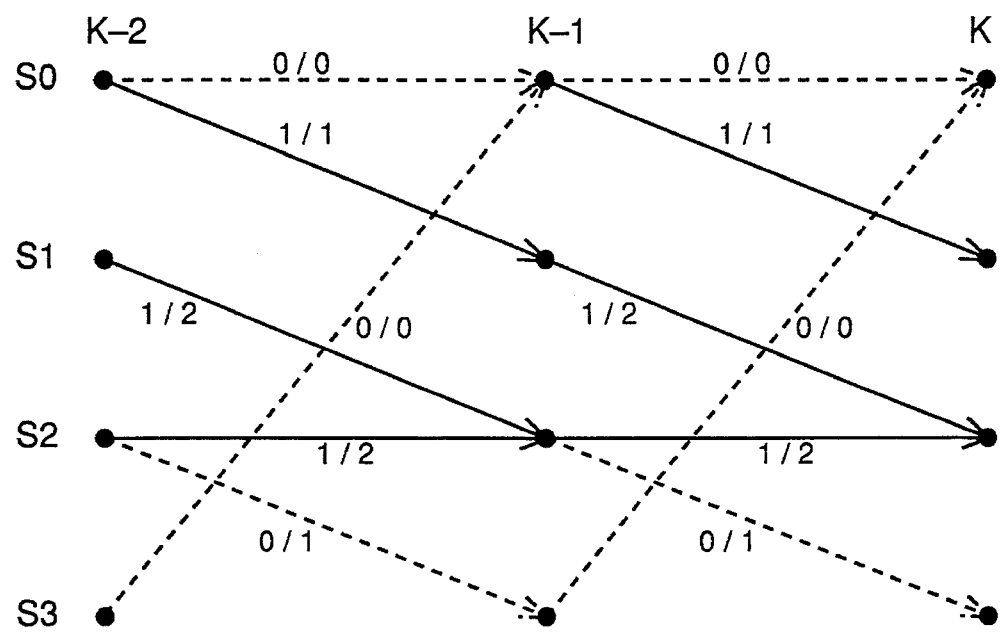
FIG._17

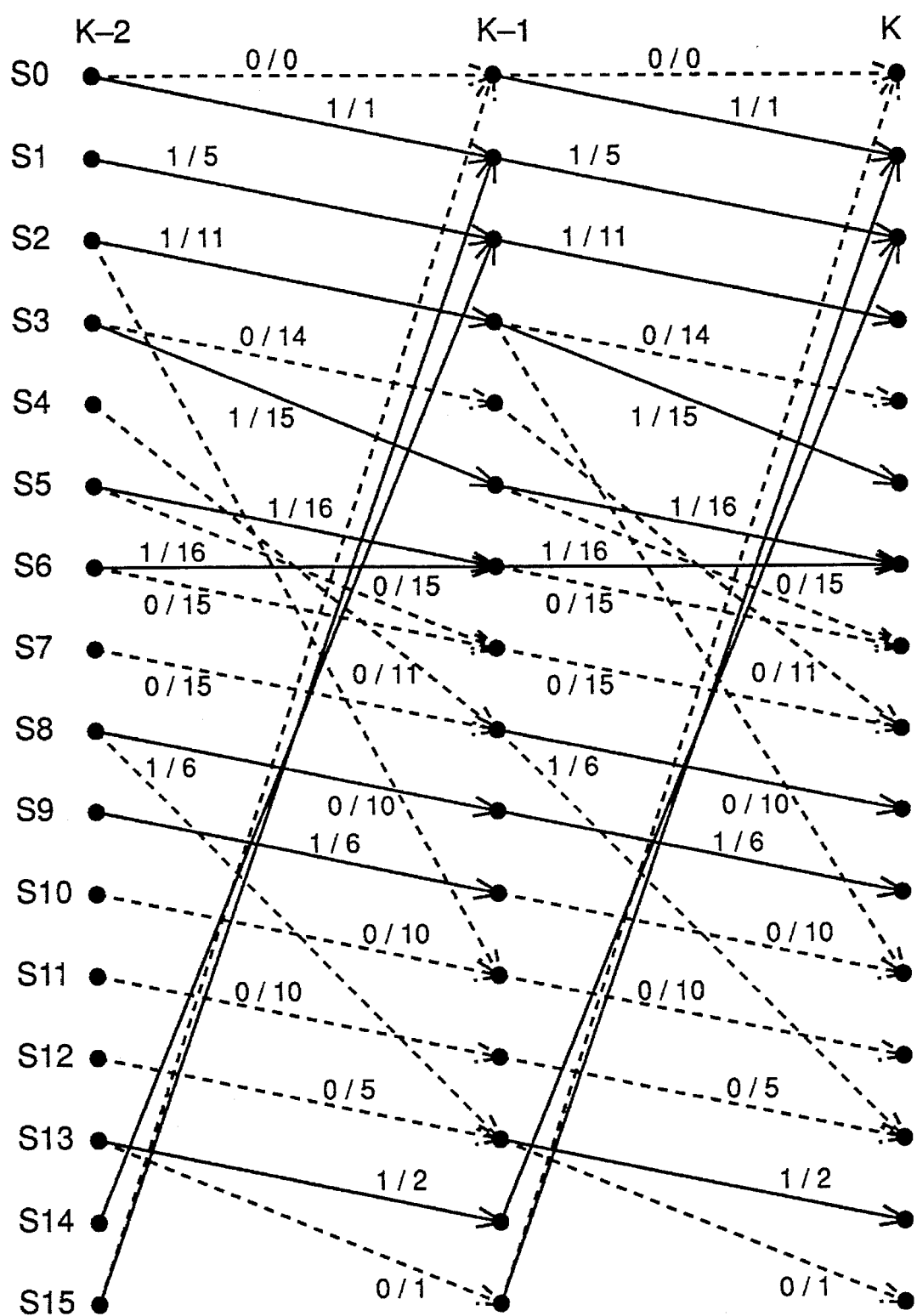
FIG._18

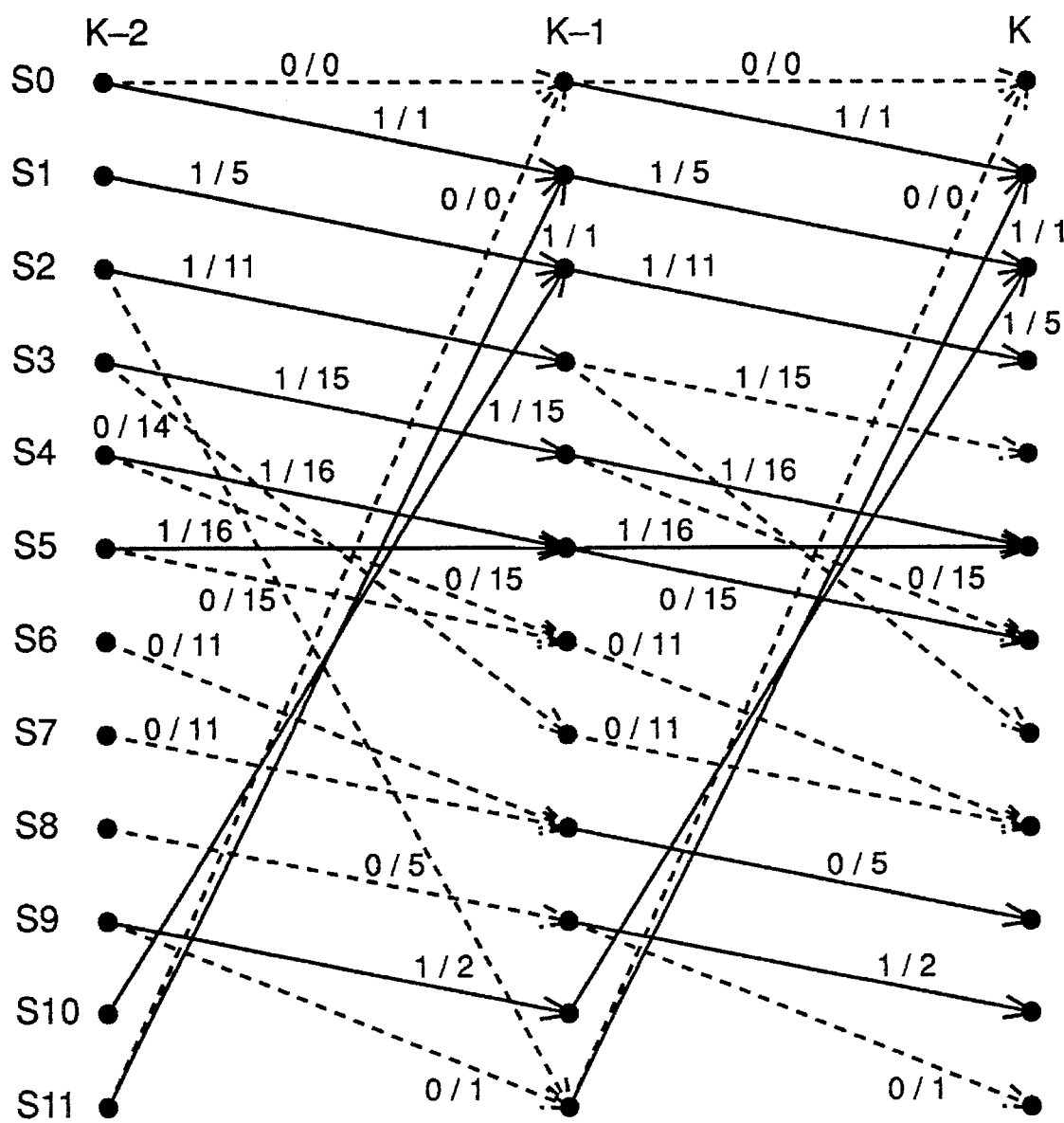
FIG._20

IMPROVED MAGNETO-OPTICAL RECORDING APPARATUS FOR DIGITAL SIGNAL INFORMATION

BACKGROUND OF THE INVENTION

The present invention relates to an apparatus for recording information, and more particularly, it relates to an apparatus for recording digital signal information.

Structures of the type characterized by employing a PRML (Partial Response Maximum Likelihood) method to read a signal magnetically recorded have been disclosed in, for example, Japanese Patent Laid-Open No. 5-2842 and Japanese Patent Laid-Open No. 4-221464. A known example of the type using the PRML to record information magneto-optically has been disclosed in "Novel Application of Viterbi Decoding Method Utilizing Variable-Length Block Codes and Limitation d to Magneto-Optical Recording", the Television, 44, 10, pp. 1369 to 1375 written by Osawa, Yamauchi and Tazaki (1990). Since the OTF (Optical Transfer Function) of the optical system for use in magneto-optical recording is a SINC function, a PR system called "PR (1,1)" having frequency characteristics like those of the SINC function has been employed. The system in the foregoing case is, for example, shown in FIG. 2. A modulator 21 modulates recording data and a precoder 22 precodes the modulated recording data to obtain a code. The code is then recorded and read by a magneto-optical drive 23. The waveform of a read-out signal is changed by an equalizer 24, and noise of the read-out signal is removed by a low pass filter (LPF) 25. Then, an output signal from LPF 25 is quantized by an A/D converter 26. The thus-obtained quantized value is used for decoding in a Viterbi decoder 27 before it is demodulated by a demodulator 28. The cut-off frequency of LPF 25 is usually set to ½ D in the above case, D being the delay time for one bit of the read-out signal. Further, the characteristic of precoder 22 is made to be [1/(1+D)] and the characteristics obtained by adding the characteristic of magneto-optical drive 23 and that of equalizer 24 are made to be (1+D) so that a read-out signal, the recording/reading characteristics of which have been canceled, is supplied to Viterbi decoder 27. Equalizer 24 has a structure, for example, as shown in FIG. 3. Equalizer 24 comprises delay devices 31, coefficient multipliers 32 and an adder 33. Viterbi decoder 27 has a presupposed path memory 41 (shown in FIG. 4) storing expected values obtained from the waveforms of data columns having number of bits corresponding to the constraint length. An ACS circuit 42 includes an adder (A), a comparator (C) and a selector (S). By the adder (A), ACS circuit 42 obtains the sum of the square output of the difference between a sample value of the read-out signal, the waveform of which has been equalized by an equalizer 24, and the expected value supplied from presupposed path memory 41 and a path metric value calculated previously. The outputs representing the results of the additions are subjected to a comparison by the comparator (C) to selectively output the smaller output from the selector (S). The final value of the thus-selected presupposed path memory is supplied to a path memory 43. Although the value received by path memory 43 is not the most probable value as the demodulated data, it is the most probable value at present because it continues to the presupposed path. A pass selector 44 selects the minimum value of the path metric value at the above moment to select the path continuing to the above state to make the final data to be the demodulated data.

The conventional system of the type combining PR(1, 1) and Viterbi decoding is an excellent detection method because of its satisfactory decoding capability as compared with the level detection system. The problems experienced with PR (1, 1) will now be described while describing the method of designing the equalizer and so forth for use in the above-described detection system. In a case of FIG. 2, assuming that the transfer function of magneto-optical drive 23 is H (f), the transfer function of equalizer 24 is E (f), and the transfer function of PR (1, 1) ((1+D)) is $PR_{11}$ (f). Equalizer 24 is designed to satisfy the following equation:

$$H(f) \cdot E(f) = PR_{11}(f)$$

FIG. 5 is a graph showing the frequency characteristic of the transfer function of equalizer 24 expressed by a curve 51, the frequency characteristic of the transfer function of ideal PR (1, 1) equalization expressed by a curve 52 and the frequency characteristic of the transfer function of magneto-optical drive 23 expressed by a curve 53 in a case where the recording density is low. In the case of FIG. 5, frequency $f_{11}$ that realizes the equation $PR_{11}$ (f)=0 is lower than frequency $f_H$ that realizes the relationship H(f)=0. Therefore, equation H (f)·E(f)=$PR_{11}$ (f) is substantially accurately held. In this case, equalization error can be decreased relatively. If the recording density shown in FIG. 5 is raised, the value of $f_{11}$ is enlarged, resulting in $f_{11} = f_H$ and then $f_{11} > f_H$. FIG. 6 shows the frequency characteristic of the transfer function of equalizer 24 expressed by a curve 61, the frequency characteristic of the transfer function of ideal PR (1, 1) equalization expressed by a curve 62 and the frequency characteristic of the transfer function of magneto-optical drive 23 expressed by a curve 63 in a case where the relationship $f_{11} > f_H$ is realized. In the foregoing case, a state H(f)=0 is held in the state where the frequency holds the relationship $f_H < f$. As a result, the relationship H(f)·E(f)=$PR_{11}$ (f) cannot be held. Therefore, it is mathematically impossible to design E (f) that completely satisfies H (f)·E (f)=$PR_{11}$ (f). As a result, there arises a problem that the equalization error becomes more critical. In order to prevent the equalization error, the number of taps of the transversal filter must be increased. Even if the number of the taps is increased, there arises a problem in that the equalization error cannot satisfactorily be prevented, resulting in unexpected intensification of high frequency exaggeration. As a result, there arises problems in that the equalizing performance of PR (1, 1) deteriorates and the decoding performance also deteriorates.

SUMMARY OF THE INVENTION

Accordingly, an object of the present invention is to overcome the foregoing problems.

In the conventional PR (1, 1) method, equalizer 24 shown in FIG. 2 has been designed to satisfy H(f)·E (f)=$PR_{11}$(f). The reason why E(f) cannot accurately be designed is that $PR_{11}$(f) is not zero in a case where $f_H < f < f_{11}$ though H(f) is zero if the frequency holds the relationship $f_H < f$. Accordingly, equalization performed in such a manner that a function having values as much as possible approaching zero if $f_H < f < f_{11}$ as the post-equalization transfer function $PR_{11}$(f) enables a relatively accurate E (f) to be designed. FIG. 7 shows the frequency characteristics of transfer functions $PR_{121}$(f), $PR_{1331}$(f) and $PR_{14641}$(f) (respectively given reference numerals 71, 72, 73 and 74) in a case where n of $(1+D)^n$ is 1 to 4 and the frequency characteristic (given reference numeral 75) of the transfer function of the magneto-optical drive shown in FIG. 6. Since $PR_{1331}$ (f) (73)

indefinitely approaches zero at a lower frequency as compared with $PR_{11}(f)$ (71), $E(f)$ capable of substantially satisfying $H(f) \cdot E(f) = PR_{1331}(f)$ can be designed. Also $PR_{14641}(f)$ (74) can be applied in the above method. However, in the above case the signal is formed into a multi-value signal and therefore the S/N ratio deteriorates, thus raising the necessity of applying Viterbi decoding to compensate the deterioration in the S/N ratio.

The operation of the present invention is categorized into the following six operations.

(1) FIG. 8 shows the results of plotting equalization errors with respect to recording densities, the equalization error being taken place where the read-out waveforms at a variety of recording densities are equalized to $(1+D)$, $(1+D)^2$, $(1+D)^3$, $(1+D)^4$ and $(1+D)^5$, respectively. Reference numerals 81, 82, 83, 84 and 85 respectively represent equalization errors in a case where equalizations to $(1+D)$, $(1+D)^2$, $(1+D)^3$, $(1+D)^4$ and $(1+D)^5$ have been made. As can be seen from FIG. 8, the larger n of $(1+D)^n$ is, the smaller the equalization error becomes. Therefore, the equalization can be facilitated by a degree in proportion to n.

(2) FIG. 9 shows the results of plotting equalization errors with respect to the number of taps of the transversal filter in a case where n of $(1+D)^n$ is 1 to 4. Reference numeral 91 represents equalization errors taken place when n=1,; reference numeral 92 represents equalization errors taken place when n=2,; reference numeral 93 represents equalization errors taken place when n=3; and reference numeral 94 represents equalization errors taken place when n=4. It can be seen that for a larger n, equalization errors can be obtained with smaller number of taps. Therefore, the transversal filter can be simplified.

(3) FIG. 10 shows average noise electric power realized when equalization has been performed by transversal filters having the same number of taps in a case where n of $(1+D)^n$ is 1 to 4. It can be seen that for a larger n, the average noise electric power is made smaller and the noise exaggeration is restricted. As a result, a good effect can be obtained in the Viterbi decoding if n is larger because noise generation can be prevented.

(4) FIG. 11 shows the self-correlation function of noise generated after equalization has been performed by using transversal filters having the same number of taps in a case where n of $(1+D)^n$ is 1 to 4. Referring to FIG. 11, reference numeral 111 represents a case where n=1; reference numeral 112 represents a case where n=2; reference numeral 113 represents a case where n=3; and reference numeral 114 represents a case where n=4. A fact has been known that the performance of the Viterbi decoding can be improved if noise has no correlation approximating white. In the case shown in FIG. 11, for a larger n, noise has no self correlation approximating white. Therefore, for a larger n, a further satisfactory effect can be obtained in the Viterbi decoding.

(5) Since the value of the transfer function approaches zero at a lower frequency in inverse proportion to n of $(1+D)^n$, the cut-off frequency of the low pass filter 25 shown in FIG. 2 can be set to a value lower than ½ D. Since noise having the frequency higher than the cut-off frequency can be removed in the foregoing case, the S/N ratio can be somewhat improved.

(6) FIG. 12 shows the results of plotting the relationship between the S/N ratio of Viterbi decoding of multi-value signals and error rates in a case where ideal equalization is performed with $(1+D)^n$ with respect to the (1, 7) RLL code (in a case where equalization is performed when the equalization error is zero). Reference numerals 121, 122, 123, 124 and 125 respectively represent the relationships between error rates in the Viterbi decoding and the S/N ratios corresponding to $(1+D)$, $(1+D)^2$, $(1+D)^3$, $(1+D)^4$ and $(1+D)^5$. Viterbi decoding performed with longer constraint length, that is, with larger n of $(1+D)^n$, has more satisfactory decoding performance. In addition to the effects obtained in (1) to (5), the Viterbi decoding performance can be improved. However, the larger n is, the more the signal becomes multi-value signal, thus deteriorating the S/N ratio. As a result, the decoding performance deteriorates. That is, a value of n that is able to improve the decoding performance to a maximum level is present somewhere. FIG. 13 shows the results of plotting of the S/N ratios when the error rate becomes $10^{-5}$ with respect to n of $(1+D)^n$. It can be seen that the required S/N ratio is made smallest when n is 3 or 4. As a result, excellent decoding performance can be maintained even if the recording density is increased.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is a diagram which illustrates the principle of the present invention;

FIG. 2 is a diagram which illustrates the principle of a conventional example comprising a PRML;

FIG. 3 is a diagram which illustrates an equalizer;

FIG. 4 is a diagram which illustrates a Viterbi decoder;

FIG. 5 is a graph of the frequency characteristic of a transfer function in a case of a low recording density;

FIG. 6 is a graph of the frequency characteristic of a transfer function in a case of a high recording density;

FIG. 7 is a graph of the frequency characteristic of the transfer function of $(1+D)^n$;

FIG. 8 is a graph of the relationship between the recording density and the equalization error in a case where equalization to $(1+D)^n$ is performed;

FIG. 9 is graph of the relationship between the number of taps of a transversal filter and the equalization error;

FIG. 10 is a graph of average noise electric power in a case where equalization to $(1+D)^n$ is performed;

FIG. 11 is a graph of self-correlation function of noise in a case where equalization to $(1+D)n$ is performed;

FIG. 12 is a graph of the relationship between the error rate and the S/N ratio in Viterbi decoding in a case where equalization to $(1+D)n$ is performed with a equalization error of zero;

FIG. 13 is a graph of the relationship between the S/N ratio and n required to achieve an error rate of $10^{-5}$ in a case where equalization to $(1+D)^n$ is made to perform the Viterbi decoding;

FIG. 14 is a diagram which illustrates the eye pattern in a case where (1, 7) PLL code is NRZI-recorded to ideally equalize to $(1+D)$;

FIG. 15 is a trellis diagram of the first embodiment;

FIG. 16 is a graph of the relationship between the recording density and the error rate according to the example of the present invention and that according to a comparative example;

FIG. 17 is a trellis diagram of the comparative example;

FIG. 18 is a trellis diagram of a second embodiment;
FIG. 19 is a trellis diagram of a third embodiment; and
FIG. 20 is a trellis diagram of a fourth embodiment.

DESCRIPTION OF THE PREFERRED EMBODIMENTS

First Embodiment

A first embodiment of the present invention will now be described with reference to FIG. 1. FIG. 1 shows a decoding modulator 11 coupled to a NRZI (No Return to Zero Inverse) encoder 12, which is coupled to a magneto-optical drive 13, which is, in turn, coupled to an equalizer 14. The equalizer is coupled to an analog-to-digital (A/D) converter 15, which is coupled to a digital low-pass filter (LPF) 16, which is, in turn, coupled to a Viterbi decoder 17. The Viterbi decoder is then coupled to a demodulator 18. Equalizer 14 comprises delay devices set to have delay time D for one bit, a coefficient multiplier and an adder. The coefficient of equalizer 14 is set so that the transfer function of magneto-optical drive 13 and equalizer 14 is made to be $(1+D)^3$. Data is modulated to (1, 7) RLL code by encoding modulator 11, and then data is NRZI-coded so that magneto-optical recording is performed. The cut-off frequency of LPF 16 is set to a value from ½ D to ⅙ D when the delay time for one bit is D, preferably ¼ D to ⅕ D. FIG. 20 shows an ideal eye pattern of the equalization waveform of equalizer 14 in a case where the NRZI code of (1, 7) RLL is read out. Referring to FIG. 14, 0, 1, 2, 4, 6, 7 and 8 are expected values of a data column with respect to equalization waveform. Since the equalizer is, in the above case, considered to be a trellis encoder having a constraint length of 4, the trellis diagram of Viterbi decoder 17 in a case where the internal state of the trellis encoder is paid attention is formed as shown in FIG. 15. Data items 0 and 1 of the longest period series (series M) were used as recording data items, the data items were recorded and read out at a recording density of 0.28 μm/bit to 0.35 μm/bit, data obtained after the read-out signal had been demodulated and received data were subjected to a comparison to measure the error rate. The results are shown in FIG. 16 and indicated by reference numeral 160.

A comparative example will now be described in which the coefficient of equalizer 14 is set so as to make the transfer function of magneto-optical drive 13 and equalizer 14 to be (1+D). The cut-off frequency of LPF 16 is made to be ½ D in a case where the delay time for one bit is D. Read-out signals from LPF 16 are converted to three values, 0, 1 and 2 to discriminate the level. Then, the read-out state is made to be four states, S0, S1, S2 and S3. When 0 is received in the state S0, the state is shifted to the state S0 and the output data is made to be 0. When 1 is received in the state S0, the state is transmitted to the foregoing state S1 and the output data is made to be 1. When 1 is received in the state S1, the state is transmitted to the state S2 and the output data is made to be 2. When 0 is received in the foregoing state S2, the state is transmitted to the state S3 and the output data is made to be 2. When 0 is received in the state S3, the state is transmitted to the foregoing state S0 and the output data is made to be 0. In accordance with the state transition rule, the most probable state transition is estimated to determine the trellis diagram so that the Viterbi decoding is performed. The trellis diagram in the above case is as shown in FIG. 17. Data items 0 and 1 of the longest period series (series M) were used as recording data items, the data items were recorded and read out at a recording density of 0.30 μm/bit to 0.35 μm/bit, data obtained after the readout signal had been demodulated and received data were subjected to a comparison to measure the error rate. The results are shown in FIG. 16 and indicated by reference numeral 161. As can be seen from FIG. 16, the error rate can significantly be improved in the case where the equalization is performed with $(1+D)^3$.

As discussed above in reference to Embodiment 1, a replayed signal showing an eye pattern is illustrated in FIG. 14. In the figure, each mark shown along the horizontal axis (i.e., 11–14) indicates the time determining data. Such a given point of time is identified by "t". The output at the point of time, i.e., the corresponding value along the vertical axis, is identified by "A(t)."

Since "D" is referred to a bit pitch as shown in Embodiment 1, the D corresponds to the time between the marks along the horizontal axis in FIG. 14. Therefore, time (t+D) indicates the time that is offset on the horizontal axis by a single mark. Output A at the time (t+D) corresponds to the value along the vertical axis at that time.

Second Embodiment

In the method according to the first embodiment, the coefficient of the equalizer is so set that the transfer function of the magneto-optical drive and the equalizer is made to be $(1+D)^4$. Data is modulated to (1, 7) RLL code by a recording control portion, and then data is NRZI-coded so that magneto-optical recording is performed. The cut-off frequency of the LPF is made to be a value from ½ D to ⅙ D when the delay time for one bit is D, preferably ¼ D to ⅕ D. In this case, 0, 1, 2, 5, 6, 11, 14, 15 and 16 are expected values of a data column with respect to equalization waveform. Since the equalizer is, in this case, considered to be a trellis encoder having a constraint length of 5, the trellis diagram of the Viterbi decoder in a case where the internal state of the trellis encoder is paid attention is formed as shown in FIG. 18. Data items 0 and 1 of the longest period series (series M) were used as recording data items, the data items were recorded and read out at a recording density of 0.28 μm/bit to 0.35 μm/bit, data obtained after the read-out signal had been demodulated and received data were subjected to a comparison to measure the error rate. The results are shown in FIG. 16 and indicated by reference numeral 162. It can be seen that the error rate can be improved as compared with the case where equalization has been performed with (1+D).

Third Embodiment

In the method according to the second embodiment, data is modulated to (2, 7) RLL code by the recording control portion, and then data is NRZI-coded so that magneto-optical recording is performed. The cut-off frequency of the LPF is made to be a value from ½ D to ⅙ D when the delay time for one bit is D, preferably ¼ D to ⅕ D. In this case, 0, 1, 2, 5, 6, 11, 14, 15 and 16 are expected values of a data column with respect to equalization waveform. The trellis diagram of the Viterbi decoder in this case is formed as shown in FIG. 19. Data items 0 and 1 of the longest period series (series M) were used as recording data items, the data items were recorded and read out at a recording density of 0.28 μm/bit to 0.35 μm/bit, data obtained after the read-out signal had been demodulated and received data were subjected to a comparison to measure the error rate. The results are shown in FIG. 16 and indicated by reference numeral 163. It can be seen that the error rate can be improved as compared with the case where equalization has been performed with (1 +D).

Fourth Embodiment

With the method according to the second embodiment, the coefficient of the equalizer is set so as to make the transfer function of the equalizer of the magnetooptical drive to be $(1+D)^4$. Data is modulated to (2, 7) RLL code by the recording control portion, and then data is NRZI-coded so that magneto-optical recording is performed. The cut-off frequency of the LPF is made to be a value from ½ D to ⅙ D when the delay time for one bit is D, preferably ¼ D to ⅓ D. In this case, 0, 1, 2, 5, 6, 11, 14, 15 and 16 are expected values of a data column with respect to equalization waveform. Since the equalizer is, in the foregoing case, considered to be a trellis encoder having a constraint length of 5, the trellis diagram of the Viterbi decoder is formed as shown in FIG. 20. Data items 0 and 1 of the longest period series (series M) were used as recording data items, the data items were recorded and read out at a recording density of 0.28 μm/bit to 0.35 pro/bit, data obtained after the readout signal had been demodulated and received data were subjected to a comparison to measure the error rate. The results are shown in FIG. 16 are indicated by reference numeral 164. It can be seen that the error rate can be improved as compared to the case where equalization has been performed with (1+D).

In the above embodiments, the actual state transition is shown in each trellis diagram of FIGS. 15, 18, 19 and 20. "m" of code "n/m" shown along the arrow of each state transition from k-2 to k-1 and from k-1 to k identifies the receive number, wherein "n" indicates the value inputted during each state (0 or 1).

As described above, according to the present invention, the RLL code is used and the $(1+D)^n$ equalization and the Viterbi decoding are combined together so that the decoding performance at a high-density recording operation is improved as compared with the conventional combination of PR (1, 1) and the Viterbi decoding.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A magneto-optical recording apparatus, comprising:.

a modulator for RLL (Run-Length Limited) encoding recording data;

a NRZI (Nonreturn to Zero Inverse) encoder, coupled to said modulator, for NRZI-encoding an obtained RLL code;

a magneto-optical drive, coupled to said encoder, for reading out signals from a magneto-optical recording medium;

an equalizer, coupled to said drive, for equalizing a read-out analog signal obtained from the magneto-optical recording medium into a waveform $(1+D)^n$ (n is a positive integer), while assuming that delay time for one bit period of said read-out signal is D, in such a manner that n is made to be at least 3 in a case where an amplitude ratio of a shortest waveform output and a longest waveform output of said read-out analog signal is ½ or more;

a low pass filter coupled to said equalizer, and a Viterbi decoder that is coupled to said low pass filter and uses the difference between a sample value obtained by quantizing an output from said low pass filter and an expected value obtained from a theoretical value of a data column so as to make the most probable path to be decoding data.

2. The magneto-optical recording apparatus according to claim 1, wherein said equalizer is of a type that n of $(1+D)^n$ is 3.

3. The magneto-optical recording apparatus according to claim 1, wherein said equalizer is of a type that n of $(1+D)^n$ is 4.

4. The magneto-optical recording apparatus according to claim 2, wherein a (1, 7) code is used as a RLL recording code, assuming that an output from said low pass filter at time t is A(t) and an output from the low pass filter at time (t+D) is A (t+D), transition state from A(t) to A (t+D) includes ten states called read-out states consisting of S0 to S9, expected values of A and A (t+D) are seven values consisting of 0, 1, 2, 4, 6, 7 and 8, if 0 is received in said state S0, the state is shifted to said state S0 and output data is made to be 0; if 1 is received in said state S0, the state is shifted to said state S1 and output data is made to be 1; if 1 is received in said state S1, the state is shifted to said state S2 and output data is made to be 4; if 0 is received in said state S2, the state is shifted to said state S3 and output data is made to be 6; if 1 is received in said state S2, the state is shifted to said state S4 and output data is made to be 7; if 0 is received in said state S3 the state is shifted to said state S7 and output data is made to be 4; if 0 is received in said state S4, the state is shifted to said state S6 and output data is made to be 7; if 1 is received in said state S4, the state is shifted to said state S5 and output data is made to be 8; if 0 is received in said state S5, the state is shifted to said state S6 and output data is made to be 7; if 1 is received in said state S5, the state is shifted to said state S5 and output data is made to be 8, if 0 is received in said state S6 the state is shifted to said state S7 and output data is made to be 4; if 0 is received in said state S7, the state is shifted to said state S9 and output data is made to be 1; if 1 is received in said state S7, the state is shifted to said state S8 and output data is made to be 2; if 1 is received in said state S8, the state is shifted to said state S2 and output data is made to be 4; if 0 is received in said state S9, the state is shifted to said state S0 and output data is made to be 0; and if 1 is received in said state S9, the state is shifted to said state S2 and output data is made to be 4; and the most probable state transition is estimated in accordance with said state transition rule to determine a trellis diagram so as to perform Viterbi decoding.

5. The magneto-optical recording apparatus according to claim 2, wherein a (2, 7) code is used as a RLL recording code, assuming that an output from said low pass filter at time t is A(t) and an output from the low pass filterat time (t+D) is A (t+D), transition state from A(t) to A (t+D) includes eight states called read-out states consisting of S0 to 87, expected values of A(t) and A (t+D) are five values consisting of 0, 1, 4, 7 and 8, if 0 is received in said state S0, the state is shifted to said state S0 and output data is made to be 0; if 1 is received in said state S0, the state is shifted to said state S1 and output data is made to be 1; if 1 is received in said state S1, the state is shifted to said state S2 and output data is made to be 4; if 1 is received in said state 82, the state is shifted to said state 83 and output data is made to be 7; if 0 is received in said state S3, the state is shifted to said state 86 and output data is made to be 4; if 1 is received in said state 83, the state is shifted to said state S4 and output data is made to be 8; if 0 is received in said state S4, the state is shifted to said state 85 and output data is made to be 7; if 1 is received in said state S4, the state is shifted to said state 84 and output data is made to be 8; if 0 is received in said state 85, the state is shifted to said state 86 and output data is made to be 4; if 0 is received in said state 86, the state is shifted to said state 87 and output data is made to be 1; if 0 is received in said state 87, the state is shifted to said state S0 and output data is made to be 0; and if 1 is received in said state 87, the state is shifted to said state S1 and output data is made to be 1; and the most probable state transition is estimated in accordance with said state transition rule to determine a trellis diagram so as to perform Viterbi decoding.

6. The magneto-optical recording apparatus according to claim 3; wherein a (1, 7) code is used as a RLL recording code, assuming that an output from said low pass filter at time t is A(t) and an output from the low pass filter at time (t+D) is A (t+D), transition state from A(t) to A (t+D) includes sixteen states called read-out states consisting of S0 to 815, expected values of A and A (t+D) are nine values consisting of 0, 1, 5, 6, 10, 11, 14, 15 and 16, if 0 is received in said state S0, the state is shifted to said state S0 and output data is made to be 0; if 1 is received in said state S0, the state is shifted to said state S1 and output data is made to be 1; if 1 is received in said state S1, the state is shifted to said state S2 and output data is made to be 5; if 0 is received in said state S2, the state is shifted to said state S11 and output data is made to be 10; if 1 is received in said state S2, the state is shifted to said state S3 and output data is made to be 11; if 0 is received in said state S3, the state is shifted to said state S4 and output data is made to be 14; if 1 is received in said state S3, the state is shifted to said state S5 and output data is made to be 15; if 0 is received in said state S4, the state is shifted to said state S8 and output data is made to be 11; if 0 is received in said state S5, the state is shifted to said state S7 and output data is made to be 15; if 1 is received in said state S5, the state is shifted to said state S6 and output data is made to be 16; if 0 is received in said state S6, the state is shifted to said state S7 and output data is made to be 15; if 1 is received in said state S6, the state is shifted to said state S6 and output data is made to be 16; if 0 is received in said state S7, the state is shifted to said state S8 and output data is made to be 15; if 0 is received in said state S8, the state is shifted to said state S13 and output data is made to be 5; if 1 is received in said state S8, the state is shifted to said state S9 and output data is made to be 6; if 1 is received in said state S9, the state is shifted to said state S10 and output data is made to be 6; if 0 is received in said state S10, the state is shifted to said state S11 and output data is made to be 10; if 0 is received in said state S11, the state is shifted to said state S12 and output data is made to be 5; if 0 is received in said state S13, the state is shifted to said state S15 and output data is made to be 1; if 1 is received in said state S14, the state is shifted to said state S2 and output data is made to be 5; if 0 is received in said state S15, the state is shifted to said state S0 and output data is made to be 0; if 1 is received in said state S15, the state is shifted to said state S1 and output data is made to be 1; and the most probable state transition is estimated in accordance with said state transition rule to determine a trellis diagram so as to perform Viterbi decoding.

7. The magneto-optical recording apparatus according to claim 3; wherein a (2, 7) code is used as a RLL recording code, assuming that an output from said low pass filter at time t is A(t) and an output from the low pass filter at time (t+D) is A (t+D), transition state from A(t) to A (t+D) includes twelve states called read-out states consisting of S0 to S11, expected values of A(t) and A (t+D) are seven values consisting of 0, 1, 2, 5, 11, 15 and 16, if 0 is received in said state S0 the state is shifted to said state S0 and output data is made to be 0; if 1 is received in said state S0, the state is shifted to said state S1 and output data is made to be 1; if 1 is received in said state S1, the state is shifted to said state S2 and output data is made to be 5; if 1 is received in said state S2, the state is shifted to said state S3 and output data is made to be 11; if 0 is received in said state S3, the state is shifted to said state S7 and output data is made to be 14; if 1 is received in said state S3, the state is shifted to said state S4 and output data is made to be 15; if 0 is received in said state S4, the state is shifted to said state S6 and output data is made to be 15; if 1 is received in said state S4, the state is shifted to said state S5 and output data is made to be 16; if 0 is received in said state S5, the state is shifted to said state S6 and output data is made to be 15; if 1 is received in said state S5, the state is shifted to said state S5 and output data is made to be 16; if 0 is received in said state S6, the state is shifted to said state S8 and output data is made to be 11; if 0 is received in said state S7, the state is shifted to said state S8 and output data is made to be 11; if 0 is received in said state S8, the state is shifted to said state S9 and output data is made to be 5; if 0 is received in said state S9, the state is shifted to said state S11 and output data is made to be 1; if 1 is received in said state S9, the state is shifted to said state S10 and output data is made to be 2; if 1 is received in said state S10, the state is shifted to said state S2 and output data is made to be 5; if 0 is received in said state S11, the state is shifted to said state S0 and output data is made to be 0; if 1 is received in said state S11, the state is shifted to said state S1 and output data is made to be 0; and the most probable state transition is estimated in accordance with said state transition rule to determine a trellis diagram so as to perform Viterbi decoding.

8. The magneto-optical recording apparatus according to claim 1, wherein the cut-off frequency of said low pass filter is ½ D to ⅙ D assuming that the delay time for one bit period of said read-out signal is D.

9. A magneto-optical recording apparatus, comprising.

a modulator for RLL (Run-Length Limited) encoding recording data;

a NRZI (Nonreturn to Zero Inverse) encoder, coupled with said modulator, for NRZI-encoding an obtained RLL code;

a magneto-optical drive, coupled to said encoder, for reading out signals from a magneto-optical recording medium;

an equalizer that is coupled to said drive and quantizes a read-out analog signal obtained from the magneto-optical recording medium for each bit period to have a waveform $(1+D)^n$ (n is a positive integer) while assuming that delay time for a bit period of said read-out signal is D;

a low pass filter, coupled to said equalizer, for cutting off high frequency output from said equalizer; and a Viterbi decoder that is coupled to said low pass filter and uses the difference between an output from said low pass filter and an expected value obtained from a theoretical value of a data column so as to make the most probable path to be decoding data.

10. The magneto-optical recording apparatus according to claim 9, wherein said equalizer is of a type that n of $(1+D)^n$ is 3.

11. The magneto-optical recording apparatus according to claim 9, wherein said equalizer is of a type that n of $(1+D)^n$ is 4 used.

12. The magneto-optical recording apparatus according to claim 10, wherein a (1, 7) code is used as a RLL recording code, assuming that an output from said low pass filter at time t is A(t) and an output from the low pass filter at time (t+D) is A (t+D), transition state from A(t) to A (t+D) includes ten states called read-out states consisting of S0 to S9, expected values of A(t) and A (t+D) are seven values consisting of 0, 1, 2, 4, 6, 7 and 8, if 0 is received in said state S0, the state is shifted to said state S0 and output data is made to be 0; if 1 is received in said state S0, the state is shifted to said state S1 and output data is made to be 1; if 1 is received in said state S1, the state is shifted to said state S2 and output data is made to be 4; if 0 is received in said state S2, the state is shifted to said state S3 and output data is made to be 6; if 1 is received in said state S2, the state is shifted to said state S4 and output data is made to be 7; if 0 is received in said state S3, the state is shifted to said state S7 and output data is made to be 4; if 0 is received in said state S4, the state is shifted to said state S6 and output data is made to be 7; if 1 is received in said state S4, the state is shifted to said state S5 and output data is made to be 8; if 0 is received in said state S5, the state is shifted to said state S6 and output data is made to be 7; if 1 is received in said state S5, the state is shifted to said state S5 and output data is made to be 8; if 0 is received in said state S6, the state is shifted to said state S7 and output data is made to be 4; if 0 is received in said state S7, the state is shifted to said state S9 and output data is made to be 1; if 1 is received in said state S7, the state is shifted to said state S8 and output data is made to be 2; if 1 is received in said state S8, the state is shifted to said state S2 and output data is made to be 4; if 0 is received in said state S9, the state is shifted to said state S0 and output data is made to be 0; and if 1 is received in said state S9, the state is shifted to said state S2 and output data is made to be 4; and the most probable state transition is estimated in accordance with said state transition rule to determine a trellis diagram so as to perform Viterbi decoding.

13. The magneto-optical recording apparatus according to claim 11, wherein a (2, 7) code is used as a RLL recording code, assuming that an output from said low pass filter at time t is A(t) and an output from the low pass filter at time (t+D) is A (t+D), transition state from A(t) to A (t+D) includes eight states called read-out states consisting of S0 to S7, expected values of A(t) and A (t+D) are five values consisting of 0, 1, 4, 7 and 8, if 0 is received in said state S0, the state is shifted to said state S0 and output data is made to be 0; if 1 is received in said state S0, the state is shifted to said state S1 and output data is made to be 1; if 1 is received in said state S1, the state is shifted to said state S2 and output data is made to be 4; if 1 is received in said state S2, the state is shifted to said state S3 and output data is made to be 7; if 0 is received in said state S3, the state is shifted to said state S6 and output data is made to be 4; if 1 is received in said state S3, the state is shifted to said state S4 and output data is made to be 8; if 0 is received in said state S4, the state is shifted to said state S5 and output data is made to be 7; if 1 is received in said state S4, the state is shifted to said state S4 and output data is made to be 8; if 0 is received in said state S5, the state is shifted to said state S6 and output data is made to be 4; if 0 is received in said state S6, the state is shifted to said state S7 and output data is made to be 1; if 0 is received in said state S7, the state is shifted to said state S0 and output data is made to be 0; and if 1 is received in said state S7, the state is shifted to said state S1 and output data is made to be 1; and the most probable state transition is estimated in accordance with said state transition rule to determine a trellis diagram so as to perform Viterbi decoding.

14. The magneto-optical recording apparatus according to claim 9, wherein a (1, 7) code is used as a RLL recording code, and said equalizer is of a type that n of $(1+D)^n$ is 4, wherein a read-out signal from said low pass filter is converted into seventeen values from 0 to 16 to discriminate the level, then the read-out state is made to be sixteen states consisting of S0, S1, S2, S3, S4, S5, S6, S7, S8, S9, S10, S11, S12, S13, S14 and S15, if 0 is received in said state S0 the state is shifted to said state S0 and output data is made to be 0; if 1 is received in said state S0, the state is shifted to said state S1 and output data is made to be 1; if 1 is received in said state S1, the state is shifted to said state S2 and output data is made to be 5; if 0 is received in said state S2, the state is shifted to said state S11 and output data is made to be 10; if 1 is received in said state S2, the state is shifted to said state S3 and output data is made to be 11; if 0 is received in said state S3, the state is shifted to said state S4 and output data is made to be 14; if 1 is received in said state S3, the state is shifted to said state S5 and output data is made to be 15; if 0 is received in said state S4, the state is shifted to said state S8 and output data is made to be 11; if 0 is received in said state S5, the state is shifted to said state S7 and output data is made to be 15; if 1 is received in said state S5, the state is shifted to said state S6 and output data is made to be 16; if 0 is received in said state S6, the state is shifted to said state S7 and output data is made to be 15; if 1 is received in said state S6, the state is shifted to said state S6 and output data is made to be 16; if 0 is received in said state S7, the state is shifted to said state S8 and output data is made to be 15; if 0 is received in said state S8, the state is shifted to said state S13 and output data is made to be 5; if 1 is received in said state S8, the state is shifted to said state S9 and output data is made to be 6; if 1 is received in said state S9, the state is shifted to said state S10 and output data is made to be 6; if 0 is received in said state S10, the state is shifted to said state S11 and output data is made to be 10; if 0 is received in said state S11, the state is shifted to said state S12 and output data is made to be 5; if 0 is received in said state S13, the state is shifted to said state S15 and output data is made to be 1; if 1 is received in said state S14, the state is shifted to said state S2 and output data is made to be 5; if 0 is received in said state S15, the state is shifted to said state S0 and output data is made to be 0; and if 1 is received in said state S15, the state is shifted to said state S1 and output data is made to be 1; and the most probable state transition is estimated in accordance with said state transition rule to determine a trellis diagram so as to perform Viterbi decoding.

15. The magneto-optical recording apparatus according to claim 9, wherein a (2, 7) code is used as a RLL recording code, said equalizer is of a type that n of $(1+D)^n$ is 4, a read-out signal from said low pass filter is converted into seventeen values from 0 to 16 to discriminate the level, then the read-out state is made to be twelve states consisting of S0, S1, S2, S3, S4, S5, S6, S7, S8, S9, S10 and S11, if 0 is received in said state S0, the state is shifted to said state S0 and output data is made to be 0; if 1 is received in said state S0, the state is shifted to said state S1 and output data is made to be 1; if 1 is received in said state S1, the state is shifted to said state S2 and output data is made to be 5; if 1 is received in said state S2, the state is shifted to said state S3 and output data is made to be 11; if 0 is received in said state S3, the state is shifted to said state S7 and output data is made to be 14; if 1 is received in said state S3, the state is shifted to said state S4 and output data is made to be 15; if 0 is received in said state S4, the state is shifted to said state S6 and output data is made to be 15; if 1 is received in said state S4, the state is shifted to said state S5 and output data is made to be 16; if 0 is received in said state S5, the state is shifted to said state S6 and output data is made to be 15; if 1 is received in said state S5, the state is shifted to said state S5 and output data is made to be 16; if 0 is received in said state S6, the state is shifted to said state S8 and output data is made to be 11; if 0 is received in said state S7, the state is shifted to said state S8 and output data is made to be 11; if 0 is received in said state S8, the state is shifted to said state S9 and output data is made to be 5; if 0 is received in said state S9, the state is shifted to said state S11 and output data is made to be 1; if 1 is received in said state S9, the state is shifted to said state S10 and output data is made to be 2; if 1 is received in said state S10, the state is shifted to said state S2 and output data is made to be 5; if 0 is received in said state S11, the state is shifted to said state S0 and output data is made to be 0; if 1 is received in said state S11, the state is shifted to said state S1 and output data is made to be 0; and the most probable state transition is estimated in accordance with said state transition rule to determine a trellis diagram so as to perform Viterbi decoding.

16. The magneto-optical recording apparatus according to claim 9, wherein the cut-off frequency of said low pass filter is ½ D to ¼ D assuming that the delay time for one bit period of said read-out signal is D.

17. A magneto-optical recording apparatus, comprising:
   a modulator for RLL (Run-Length Limited) encoding recording data;
   a NRZI (Nonreturn to Zero Inverse) encoder, coupled to said modulator, for NRZI-encoding an obtained RLL code;
   a magneto-optical drive, coupled to said encoder, for reading out signals from a magneto-optical recording medium;
   an equalizer that is coupled to said drive and quantizes a read-out analog signal obtained from the magneto-optical recording medium for 1/m (m is an integer) of a bit period of said read-out signal to have a waveform $(1+D)^n$ (n is a positive integer) while assuming that delay time for one bit period of said read-out signal is D;
   a low pass filter, coupled to said equalizer, for cutting off high frequency output from said equalizer; and
   a Viterbi decoder that is coupled to said low pass filter and uses the difference between a sample value obtained by quantizing an output from said low pass filter and an expected value obtained from a theoretical value of a data column so as to make the most probable path to be decoding data.

18. The magneto-optical recording apparatus according to claim 17, wherein said equalizer is of a type that n of $(1+D)^n$ is 3.

19. The magneto-optical recording apparatus according to claim 17, wherein said equalizer is of a type that n of $(1+D)^n$ is 4.

20. The magneto-optical recording apparatus according to claim 17, wherein a (1, 7) code is used as a RLL recording code, and wherein said equalizer is of a type that n of $(1+D)^n$ is 3, wherein a read-out signal from said low pass filter is converted into nine values from 0 to 8 to discriminate the level, then the read-out state is made to be ten states consisting of S0, S1, S2, S3, S4, S5, S6, S7, S8 and S9, if 0 is received in said state S0 the state is shifted to said state S0 and output data is made to be 0, if 1 is received in said state S0, the state is shifted to said state S1 and output data is made to be 1; if 1 is received in said state S1, the state is shifted to said state S2 and output data is made to be 4; if 0 is received in said state S2, the state is shifted to said state S3 and output data is made to be 6; if 1 is received in said state S2, the state is shifted to said state S4 and output data is made to be 7; if 0 is received in said state S3, the state is shifted to said state S7 and output data is made to be 4; if 0 is received in said state S4, the state is shifted to said state S6 and output data is made to be 7; if 1 is received in said state S4, the state is shifted to said state S5 and output data is made to be 8; if 0 is received in said state S5, the state is shifted to said state S6 and output data is made to be 7; if 1 is received in said state S5, the state is shifted to said state S5 and output data is made to be 8; if 0 is received in said state S6, the state is shifted to said state S7 and output data is made to be 4; if 0 is received in said state S7, the state is shifted to said state S9 and output data is made to be 1; if 1 is received in said state S7, the state is shifted to said state S8 and output data is made to be 2; if 1 is received in said state S8, the state is shifted to said state S2 and output data is made to be 4; if 0 is received in said state S9, the state is shifted to said state S0 and output data is made to be 0; and if 1 is received in said state S9, the state is shifted to said state S2 and output data is made to be 4; and the most probable state transition is estimated in accordance with said state transition rule to determine a trellis diagram so as to perform Viterbi decoding.

21. The magneto-optical recording apparatus according to claim 17, wherein a (2, 7) code is used as a RLL recording code, said equalizer is of a type that n of $(1+D)^n$ is 3, a read-out signal from said low pass filter is converted into nine values from 0 to 8 to discriminate the level, then the read-out state is made to be eight states consisting of S0, S1, S2, S3, S4, S5, S6 and S7, if 0 is received in said state S0, the state is shifted to said state S0 and output data is made to be 0; if 1 is received in said state S0, the state is shifted to said state S1 and output data is made to be 1; if 1 is received in said state S1, the state is shifted to said state S2 and output data is made to be 4; if 1 is received in said state S2, the state is shifted to said state S3 and output data is made to be 7; if 0 is received in said state S3, the state is shifted to said state S6 and output data is made to be 4; if 1 is received in said state S3, the state is shifted to said state S4 and output data is made to be 8; if 0 is received in said state S4, the state is shifted to said state S5 and output data is made to be 7; if 1 is received in said state S4, the state is shifted to said state S4 and output data is made to be 8; if 0 is received in said state S5, the state is shifted to said state S6 and output data is made to be 4; if 0 is received in said state S6, the state is shifted to said state S7 and output data is made to be 1; if 0 is received in said state S7, the state is shifted to said state S0 and output data is made to be 0; and if 1 is received in said state S7, the state is shifted to said state S1 and output data is made to be 1; and the most probable state transition is estimated in accordance with said state transition rule to determine a trellis diagram so as to perform Viterbi decoding.

22. The magneto-optical recording apparatus according to claim 17, wherein a (1, 7) code is used as a RLL recording code and wherein said equalizer is of a type that n of $(1+D)^n$ is 4, wherein a read-out signal from said low pass filter is converted into seventeen values from 0 to 16 to discriminate the level, then the read-out state is made to be sixteen states consisting of S0, S1, S2, S3, S4, S5, S6, S7, S8, S9, S10, S11, S12, S13, S14 and S15, if 0 is received in said state S0, the state is shifted to said state S0 and output data is made to be 0; if 1 is received in said state S0, the state is shifted to said state S1 and output data is made to be 1; if 1 is received in said state S1, the state is shifted to said state S2 and output data is made to be 5; if 0 is received in said state S2, the state is shifted to said state S11 and output data is made to be 10; if i is received in said state S2, the state is shifted to said state S3 and output data is made to be 11; if 0 is received in said state S3, the state is shifted to said state S4 and output data is made to be 14; if 1 is received in said state S3, the state is shifted to said state S5 and output data is made to be 15; if 0 is received in said state S4, the state is shifted to said state S8 and output data is made to be 11; if 0 is received in said state S5, the state is shifted to said state S7 and output data is made to be 15; if 1 is received in said state S5, the state is shifted to said state S6 and output data is made to be 16; if 0 is received in said state S6, the state is shifted to said state S7 and output data is made to be 15; if 1 is received in said state S6, the state is shifted to said state S6 and output data is made to be 16; if 0 is received in said state S7, the state is shifted to said state S8 and output data is made to be 15; if 0 is received in said state S8, the state is shifted to said state S13 and output data is made to be 5; if 1 is received in said state S8, the state is shifted to said state S9 and output data is made to be 6; if 1 is received in said state S9, the state is shifted to said state S10 and output data is made to be 6; if 0 is received in said state S10, the state is shifted to said state S11 and output data is made to be 10; if 0 is received in said state S11, the state is shifted to said state S12 and output data is made to be 5; if 0 is received in said state S13, the state is shifted to said state S15 and output data is made to be 1; if 1 is received in said state S14, the state is shifted to said state S2 and output data is made to be 5; if 0 is received in said state S15, the state is shifted to said state S0 and output data is made to be 0; and if 1 is received in said state S15, the state is shifted to said state S1 and output data is made to be 1; and the most probable state transition is estimated in accordance with said state transition rule to determine a trellis diagram so as to perform Viterbi decoding.

23. The magneto-optical recording apparatus according to claim 17, wherein a (2, 7) code is used as a RLL recording code, said equalizer is of a type that n of $(1+D)^n$ is 4, a read-out signal from said low pass filter is converted into seventeen values from 0 to 16 to discriminate the level, then the read-out state is made to be twelve states consisting of S0, S1, S2, S3, S4, S5, S6, S7, S8, S9, S10 and S11, if 0 is received in said state S0, the state is shifted to said state S0 and output data is made to be 0; if 1 is received in said state S0, the state is shifted to said state S1 and output data is made to be 1; if 1 is received in said state S1, the state is shifted to said state S2 and output data is made to be 5; if 1 is received in said state S2, the state is shifted to said state S3 and output data is made to be 11; if 0 is received in said state S3, the state is shifted to said state S7 and output data is made to be 14; if 1 is received in said state S3, the state is shifted to said state S4 and output data is made to be 15; if 0 is received in said state S4, the state is shifted to said state S6 and output data is made to be 15; if 1 is received in said state S4, the state is shifted to said state S5 and output data is made to be 16; if 0 is received in said state S5, the state is shifted to said state S6 and output data is made to be 15; if 1 is received in said state S5, the state is shifted to said state S5 and output data is made to be 16; if 0 is received in said state S6, the state is shifted to said state S8 and output data is made to be 11; if 0 is received in said state S7, the state is shifted to said state S8 and output data is made to be 11; if 0 is received in said state S8, the state is shifted to said state S9 and output data is made to be 5; if 0 is received in said state S9, the state is shifted to said state S11 and output data is made to be 1; if 1 is received in said state S9, the state is shifted to said state S10 and output data is made to be 2; if 1 is received in said state S10, the state is shifted to said state S2 and output data is made to be 5; if 0 is received in said state S11, the state is shifted to said state S0 and output data is made to be 0; if 1 is received in said state S11, the state is shifted to said state S1 and output data is made to be 0; and the most probable state transition is estimated in accordance with said state transition rule to determine a trellis diagram so as to perform Viterbi decoding.

24. The magneto-optical recording apparatus according to claim 17, wherein the cut-off frequency of said low pass filter is ½ D to ⅙ D assuming that the delay time for one bit period of said read-out signal is D.

* * * * *